Jan. 10, 1967 R. P. MASSEY 3,297,959
POLARITY REVERSING, OUTPUT VOLTAGE CONTROLLED, ASYMMETRIC CONVERTER
Filed Dec. 16, 1963
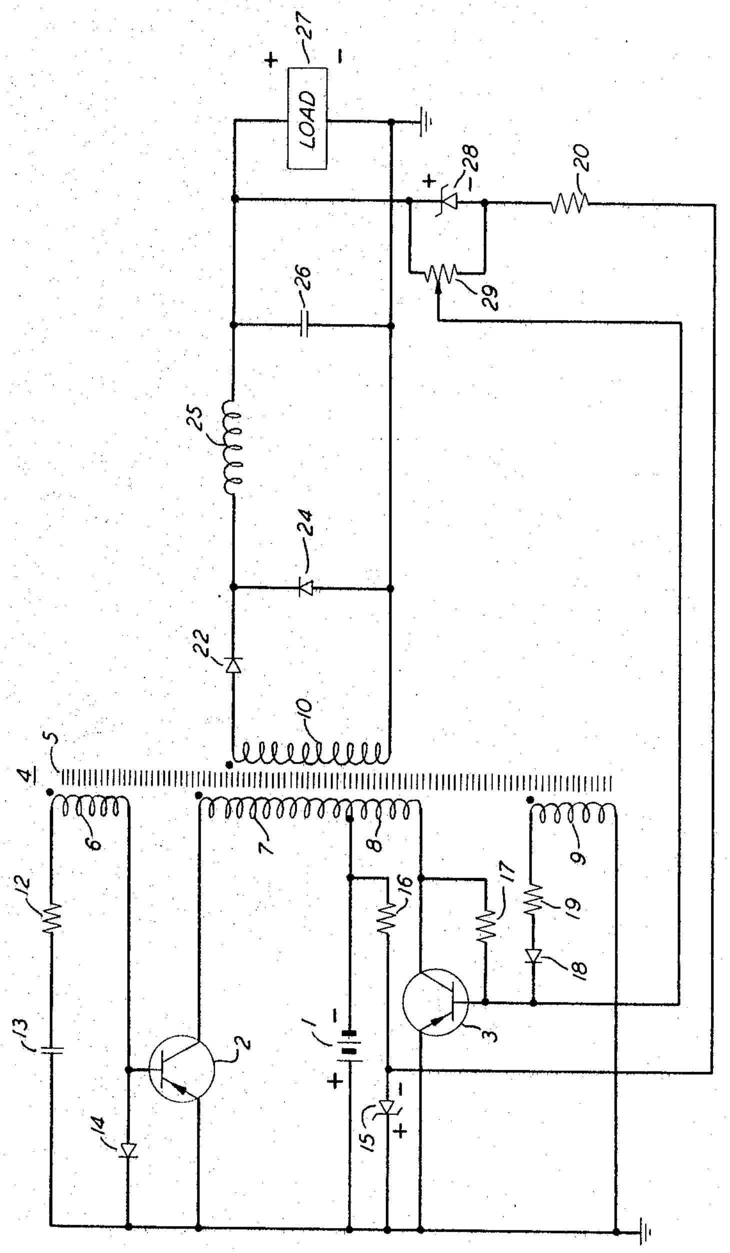
INVENTOR
R. P. MASSEY
BY R. B. Ardis
ATTORNEY United States Patent Office 3,297,959

Patented Jan. 10, 1967

3,297,959

POLARITY REVERSING, OUTPUT VOLTAGE CONTROLLED, ASYMMETRIC CONVERTER

Richard P. Massey, Westfield, N.J., assignor to Bell Telephone Laboratories, Incorporated, New York, N.Y., a corporation of New York Filed Dec. 16 1963, Ser. No. 331,054
7 Claims. (Cl. 331—113)

This invention relates to voltage conversion circuits and more particularly to regulated asymmetric transistor conversion circuits.

Asymmetric transistor converters are structurally similar to symmetric transistor converters, and, like many symmetric converters, may use a saturable transformer to control the switching action of the transistors. Unlike the symmetric converters, however, only one transistor of the assymmetric converter supplies power to the load. The other, lower power rated, transistor serves only to reset the switching transformer core without supplying any power to the load. Since the turns ratio of the saturable or switching control transformer may be adjusted so that the higher power capacity transistor conducts for a longer period of time than the lower power core reset transistor, the circuit is called an asymmetric circuit as opposed to the symmetric circuit wherein both transistors conduct for equal intervals of time and both supply power to the load. In the asymmetric converter, a half-wave rectifier is inserted between the transformer secondary winding and the load to isolate the load from the source during the period the core reset transistor is conducting.

The major advantage of the asymmetric converter is the low unit cost since only one relatively expensive high power capacity transistor is required instead of the usual two required by symmetric circuits. The asymmetric converter is limited, however, in that either no regulation is provided, or where such regulation is provided, additional regulating, and error detecting transistors with associated biasing networks are required. These additional components increase the unit cost of the converter to an unattractive figure and thus destroy the major economy advantage of the converter. For this latter reason, the use of asymmetric converters has been limited to special situations.

Moreover, in regulated asymmetric converters where it is desired to obtain polarity reversal between the source and the load as, for example, where the positive terminal of the source and the negative terminal of the load are connected to ground, additional biasing or "phasing" problems are encountered which often necessitate the use of still further additional transistors. These latter components raise the unit cost even higher until finally the point is reached where the use of an asymmetric converter becomes economically prohibitive.

One object of this invention is, therefore, to eliminate the multiplicity of additional components in a polarity reversing output voltage controlled asymmetric converter.

Another object of this invention is to do so simply, reliably, and inexpensively.

In accordance with one feature of the invention, the conductive interval impedance of the core reset or control transistor in a regulated asymmetric transistor converter is varied in accordance with load voltage variations to control the duty cycle of the power transistor and thereby maintain a substantially constant load voltage. This feature permits the simple and inexpensive incorporation of the regulating, amplifying, and error detecting functions of a regulated asymmetric converter into the core reset transistor.

In accordance with another feature of the invention, a simple and inexpensive biasing network comprising zener diodes and resistors is provided to both statically bias the core reset or control transistor for multifunctional operation and to achieve polarity reversal between the input source, the positive terminal of which is grounded, and the load, the negative terminal of which is grounded.

Other objects and features of the present invention will become apparent upon consideration of the following detailed description when taken in connection with the accompanying drawing, the single figure of which is a schematic diagram of an embodiment of the invention.

In the illustrated embodiment of the invention an output circuit comprising transformer 4 with a saturable core 5 with windings 6, 7–8, 9, and 10 wound thereon is provided with the collector-emitter paths of transistors 2 and 3 serially connected with winding portions 7 and 8, respectively, and the direct-current input source 1. Diode 18, resistor 19, and winding 9 are serially connected with the base-emitter path of transistor 3. Transistor 2 may have a higher current capacity than transistor 3 which serves only to reset the saturable core. As can be seen from the schematic representations of the drawing, the unequal turns of winding portions 7 and 8 allow transistor 2 to conduct for a longer interval than transistor 3 in typical assymmetric fashion. Diode 14 is connected in the base-emitter path of transistor 2 to limit the inverse voltage appearing between these electrodes. A speed-up network comprising capacitor 13 and resistor 12 is serially connected with winding 6 and the base-emitter path of transistor 2. Windings 6, 7–8, 9, and 10 are wound on a saturable core 5 (rectangular BH loop) of transformer 4. A supplemental biasing network for transistor 3 comprising zener diode 15 and resistor 16 is serially connected across the input source 1, while resistor 17 provides quiescent class A bias to transistor 3. Diode 22 is a half-wave rectifier. As discussed hereinafter, inductor 25 is a filter inductor and, during the nonconductive interval of transistor 2, supplies power to the load via fly-back diode 24 which serially connects the inductor 25 and the load 27. Capacitor 26 is a filter capacitor. Zener diode 28 and current-limiting resistor 20 are serially connected between the positive terminal of the load 27 and the junction of zener diode 15 and resistor 16. Potentiometer 29 is connected across zener diode 28. The wiper arm of potentiometer 29 is connected to the base electrode of transistor 3.

The operation of the circuit can best be understood by assuming that power transistor 2 is conducting and core reset transistor 3 is cut-off. Current flows from the positive terminal of the direct-current source 1, through the emitter-collector path of transistor 2, through winding portion 7, and back to the negative terminal of the source 1. As can be seen from the relative polarities of the induced potentials indicated by the dots, the voltage induced in winding 6 regeneratively drives transistor 2 further into conduction, while the voltage induced in winding 9 both biases diode 18 into conduction and drives transistor 3 further into cut-off. Further conduction through transistor 2 causes a greater potential to be induced in winding 6, which drives transistor 2 still further into conduction and toward transistor saturation in typical regenerative fashion. This regenerative process continues until the volt-second energy necessary to saturate the saturable core 5 (rectangular BH loop) is applied to the transformer 4 via winding portion 7. Once the saturable core 5 saturates, there is no longer any change of flux in transformer 4, the voltage induced in winding 6 falls to zero, and transistor 2 cuts off. The flux built up in transformer 4 then collapses, inducing a potential in windings, 6, 7–8, 9, and 10 which is of a polarity opposite to the original polarity, causing transistor 2 to be driven further into cut-off. In the usual converter configuration the collapsing flux would drive transistor 3 into conduction and start a regenerative cycle similar to that of transistor 2, as discussed heretofore. The present invention differs in that diode 18 is back biased by the collapsing flux and opens the loop comprising the winding 9. As noted heretofore, resistor 17 provides quiescent class A bias for transistor 3 and, were it not for the back-bias applied via forward biased diode 18 by winding 9 during the conduction interval of transistor 2, transistor 3 would conduct on a full-cycle basis. Once the back bias applied via diode 18 by the potential induced in winding 9 is removed, current flows through transistor 3, the magnitude of the current flow being determined by the quiescent class A bias of resistor 17. Transistor 3 need have only sufficient current capacity to reset the core since the potential now induced in winding 10 back biases half-wave rectifier diode 22 and effectively removes the load from the input circuit during the conduction interval of transistor 3.

As discussed in connection with the conduction interval of transistor 2, transistor 3 continues to conduct until sufficient volt-second energy is supplied to the saturable core 5 to saturate the core in the opposite direction. Once the core 5 again saturates the flux in transformer 4 collapses and a potential is induced in windings 6, 7–8, 9, and 10 which forward biases transistor 2, diodes 18 and 22, and back biases transistor 3. Current now flows from the positive terminal of source 1, through the emitter-collector path of transistor 2, through winding portion 7, and back to the negative terminal of source 1 thereby once again beginning the regenerative process discussed heretofore in connection with transistor 2. This oscillatory operation then continues until the source of D.C. input potential 1 is removed from the circuit.

Resistor 12 and capacitor 13, which are connected in the voltage feedback path of transistor 2, form a switching speed-up network. Diode 14 is provided both to limit the inverse emitter-base potential of transistor 2 and to provide a discharge path for the energy stored in capacitor 13 and winding 6 during the nonconductive interval of transistor 2. Resistor 19, which is the base circuit of transistor 3, is a current limiting resistor.

As noted heretofore, transistor 3 is continuously biased at a quiescent class A point by resistor 17 and is rendered nonconductive by the potential induced in winding 9 and applied via diode 18 during the conduction interval of transistor 2. As also discussed, the conduction interval of transistor 3 is determined by the volt-second energy supplied to the saturable core 5 via winding portion 8. Controlling the voltage appearing across winding portion 8 is thus an effective way to control the interval that the power supplied to the load 27 by transistor 2 is interrupted. Thus, at one extreme, transitor 3 could be saturated, all the voltage of the source 1 would appear across the winding portion 8, and the time interval for which transistor 3 conducts would be very short. At the other extreme, transistor 3 could be at the verge of cut-off or, effectively, an open circuit with all the potential appearing across the collector-emitter path of transistor 3, rather than across winding portion 8, and the condition interval of transistor 3 would be very long. Since the conduction interval of transistor 3 determines the interval that no power is supplied to the load (recalling that diode 22 is back-biased during the conduction interval of transistor 3), varying the operating point of transistor 3 around its quiescent bias point to vary the emitter-collector voltage drop of the transistor is an effective way to close the loop and introduce regulation. As discussed hereinafter, in accordance with applicant's invention, transistor 3 accomplishes the error detecting, regulating, and core reset functions of a voltage regulated asymmetric converter without the necessity for three individual transistors.

The closed loop regulating operation is best seen by assuming that the voltage appearing across the load 27 increases. Although discussed in detail hereinafter, it should be noted at this point that whereas the positive terminal of the source 1 is grounded, it is the negative terminal of the load 27 that is grounded. With this in mind, it is readily seen that since the emitter electrode of transistor 3 is grounded, the assumed change of load potential will be reflected across the base-emitter electrodes of transistor 3, with the potential appearing across potentiometer 29 remaining relatively constant. The portion of the assumed change of load potential is compared with the constant potential of zener diode 28 with the difference thereof appearing across the base-emitter path of transistor 3 as a back bias which opposes the quiescent bias established by resistor 17. The effect of the load voltage change is thus such as to increase or decrease the base-emitter bias around the quiescent operative point. For the assumed increase in load voltage, then, the base-emitter bias of transistor 3 is decreased, thereby increasing the emitter-collector impedance and the emitter-collector voltage drop of transistor 3. Since the voltages in the loop must add to the constant voltage of the source 1 and the voltage appearing across the emitter-collector path of transistor 3 has increased, the voltage across winding portion 8 must decrease. As noted heretofore, the volt-second energy required to saturate the core 5 is constant, hence a decrease in the voltage appearing across winding portion 8 will increase the time that this voltage must appear before the core 5 once again saturates. Since transistor 3 is conductive in the class A mode until the core saturates, the duration of the interval in which the power supplied to the load is interrupted is increased, thus compensating for the initial assumption of an increase in load voltage.

If an initial assumption of a decrease in load voltage were made, the voltage appearing across the emitter-collector path of transistor 3 would decrease, the voltage across winding portion 8 would increase, and the period that the power to the load is interrupted would decrease to compensate for the assumed decrease in load voltage.

Zener diode 28 is provided as a constant voltage reference and current-limiting resistor 20 insures continuous reverse conduction through zener diode 28. Zener diode 15 and resistor 16 provide a second voltage reference network wherein resistor 16 insures the continuous breakdown of zener diode 15. As discussed in detail hereinafter, these biasing networks effectively supplement the magnitude of the load voltage and the variations thereof appearing across the base-emitter path of transistor 3. This supplemental bias facilitates the selection of a static or quiescent operating point for transistor 3 such that there is no need for the gain usually supplied by the regulating, amplifying, and error detecting transistors in the usual error detector-regulating (variable impedance) transistor arrangement. Since the additional gain supplied by these components is no longer needed it follows that they may be eliminated and the core reset, regulating, amplifying, and error detecting functions may thus be combined into the single transistor 3.

The effect of the additional voltage supplied by the biasing networks is easily seen by tracing the potentials in the loop beginning with the positive terminal of the load 27, the constant positive potential of zener diode 28, the potential drop of resistor 20, the constant negative potential of zener diode 15, and back to the negative terminal of the load. Zener diode 15 thus adds a bucking or negative potential to the loop which increases static or quiescent voltages appearing across the remaining voltage variable components in the loop. If polarity reversal were not required and the voltage across the load 27 were greater than the voltage of the input source 1 in the illustrated embodiment of the invention, the resistor 20 could be returned to the noncommon terminal of the source 1, with the additional bias then being supplied by the source 1. Zener diode 15 and resistor 16 could thereby be eliminated. In either case, the additional bias thus provided eliminates the additional gain required heretofore and makes possible the combination of the core reset, regulating, and error detecting functions into a single transistor. Is should be obvious that a seperate source of potential, such as a battery, could be substituted for zener diodes 15 and 28 without changing the operation of the circuit.

Inductor 25 is a filter inductor and capacitor 26 is a filter capacitor. The enrgy stored in inductor 25 is transmitted to the load via fly-back diode 24 during the interval that diode 22 blocks the transmission of energy to the load 27.

It should be noted that if complete isolation between the source and load were desired, the core reset transistor could be placed in the output circuit simply by eliminating the source 1 from the source 1 and winding portion 8 loop and directly connecting winding portion 8 across the emitter-collector path of transistor 3. This arrangement would provide complete full-cycle isolation between the source and the load. With such an arrangement, it has been found necessary, however, to serially connect a single-pole, single-throw switch or its equivalent with the source 1 and a portion of winding portion 7 to start the circuit. Still further isolation is obtainable by adding a secondary winding to the filter inductor 25 which in turn would provide a feedback or control signal to the core reset transistor 3.

In summary, closed loop regulation is simply and inexpensively introduced into an asymmetric converter by the incorporation of the regulating, amplifying, and error detecting functions into the single, specially biased, core reset transistor 3. Transistor 3 is cut-off during the conductive interval of power transistor 3 and is operated as a load voltage variation responsive variable impedance during the nonconductive interval of transistor 2 to achieve the desired regulation. The network comprising zener diode 15 and resistor 16 provides sufficient additional bias so that polarity reversal may be obtained between the source 1, the positive terminal of which is grounded, and the load 27, the negative terminal of which is grounded.

The above-described arrangement is illustrative of the application of the principles of the invention. Other embodiments may be devised by those skilled in the art without departing from the spirit and scope of the invention.

What is claimed is:

1. A regulated converter which comprises a source of direct voltage, a transformer having a primary winding and at least one secondary winding, a power transistor and a control transistor having their emitter-collector paths connected to conduct in alternation and pass current from said source through said primary winding in respectively opposite directions, a load, a half-wave rectifier connected to supply current to said load while said power transistor is conducting and isolate said transformer from said load while said control transistor is conducting, means to detect variations in load voltage, and means to vary the conducting impedance of the emitter-collector path of said control transistor under the control of detected load voltage variations, whereby the duty cycle of said power transistor is varied to correct therefor and the load voltage is maintained substantially constant.

2. A regulated polarity reversing converter circuit which comprises a source of direct voltage, and a transformer having a primary winding and at least one secondary winding, a power transistor and a control transistor having their collector-emitter paths connected to conduct in alternation and pass current from said source through said primary winding in respectively opposite directions, a load, a half-wave rectifier connected to supply current to said load while said power transistor is conducting and to isolate said transformer from said load while said control transistor is conducting, first and second sources of constant potential serially connected in polarity opposition across said load, and means connecting said control transistor to said load and at least a portion of the potential of said first source of constant potential to compare load voltage variations with said first source of constant potential whereby the conducting impedance of the emitter-collector path of said control transistor is controlled in accordance with load voltage variations.

3. A regulated polarity reversing converter circuit in accordance with claim 2 wherein said source of direct voltage has a polarity opposite to the polarity of the voltage appearing across said load with reference to a common polarity of said source and said load.

4. A regulated asymmetric converter comprising a power and a control transistor each having base, collector, and emitter electrodes, said power transistor having an emitter-collector current carrying capacity of at least several times the emitter-collector current carrying capacity of said control transistor, a source of input potential, a saturable transformer having a primary and a secondary winding, means serially connecting said source of input potential, the emitter-collector path of said power transistor, and at least a portion of said primary winding, means serially connecting said source of input potential, the emitter-collector path of said second transistor, and the remaining portion of said input winding, means regeneratively connecting the base-emitter paths of said first and second transistors to said saturable transformer so that said first and second transistors conduct in alternation, a load, a half-wave rectifier, means serially connecting said half-wave rectifier between said load and said secondary winding, first and second sources of constant potential, means serially connecting said load, said first source of constant potential, and said second source of constant potential, and means serially connecting said load, at least a portion of said first source of constant potential, and the emitter-base path of said second transistor whereby output voltage regulation is obtained.

5. A regulated asymmetric converter circuit in accordance with claim 4 wherein said first and second sources of constant potential are serially connected in polarity opposition with respect to each other, whereby output voltage regulation may be obtained when the polarity of said source is opposite to the polarity of said load with respect to a common polarity of said source and said load.

6. A regulated asymmetric converter circuit comprising a power and a control transistor each having base, collector and emitter electrodes, said power transistor having an emitter-collector current carrying capacity of at least several times the emitter-collector current carrying capacity of said control transistor, a source of input potential, a saturable transformer having a primary and a secondary winding, means serially connecting said source of input potential, the emitter-collector path of said first transistor, and at least a portion of said primary winding, means serially connecting said source of input potential, the emitter-collector path of said second transistor, and the remaining portion of said primary winding, means regeneratively connecting the base-emitter path of said first and second transistors to said saturable transformer so that said first and second transistors conduct in alternation, a load, a half-wave rectifier, means serially connecting said half-wave rectifier between said load and said secondary winding, a source of constant potential, means serially connecting said load, said source of constant potential, and said source of input potential, and means serially connecting said load, at least a portion of said source of constant potential, and the emitter-base path of said second transistor whereby output voltage regulation is obtained.

7. A regulated asymmetric converter circuit comprising a power and a control transistor each having base, collector and emitter electrodes, said power transistor having an emitter-collector current carrying capacity of at least several times the emitter-collector current carrying capacity of said control transistor, a source of input potential, a saturable transformer having first, second, third and fourth windings wound thereon, first and second diodes, first and second zener diodes, first and second resistors, a potentiometer, means serially connecting said source of input potential, the emitter-collector path of said first transistor, and at least a portion of said first winding, means serially connecting said source of input potential, the emitter-collector path of said second transistor and the remaining portion of said first winding, means regeneratively connecting said second winding across the base and emitter electrodes of said first transistor, means serially connecting said first zener diode and said first resistor across said source of input potential, a load, means serially connecting said third winding, said first diode, and said load, said first diode being poled so that current flows to said load only during the conductive interval of said first transistor, means serially connecting the emitter electrode of said second transistor, said fourth winding, said second diode, and the base electrode of said second transistor, said second diode being poled so that base-emitter current flows in said second transistor only during the nonconductive interval of said first transistor, means connecting said second resistor from the base electrode of said second transistor to the emitter electrode of said second transistor to provide class A bias for said second transistor, means connecting said second zener diode from the juncture of said load and said first diode to the juncture of said first zener diode and said first resistor, means connecting said potentiometer across said second zener diode, and means connecting the wiper arm of said potentiometer to the base electrode of said second transistor whereby output voltage regulation is obtained.

References Cited by the Examiner

UNITED STATES PATENTS

| | | | |
|---|---|---|---|
| 2,967,989 | 1/1961 | Eno et al. | 321—2 |
| 3,069,612 | 12/1962 | Hamilton | 321—2 |
| 3,072,837 | 1/1963 | Hakimoglu | 321—2 |

FOREIGN PATENTS

| | | |
|---|---|---|
| 580,889 | 8/1959 | Canada. |

JOHN F. COUCH, *Primary Examiner.*

W. H. BEHA, *Assistant Examiner.*